May 9, 1967 A. L. LUDWIG 3,317,945
MOLDED WINDSHIELD WIPER BLADE
Filed Sept. 17, 1965 3 Sheets-Sheet 1
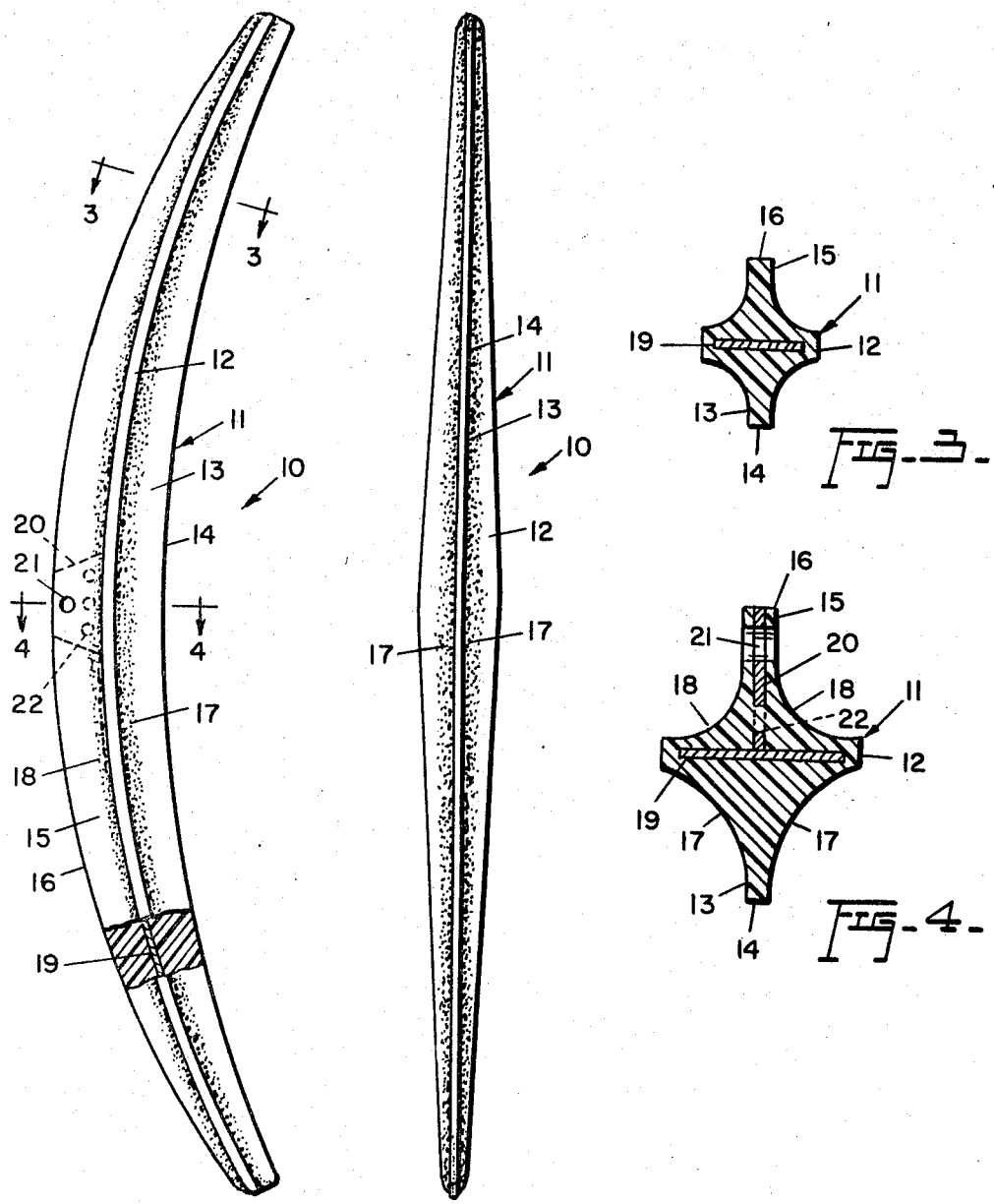
INVENTOR
ARTHUR L. LUDWIG
BY Munson H. Lane
ATTORNEY

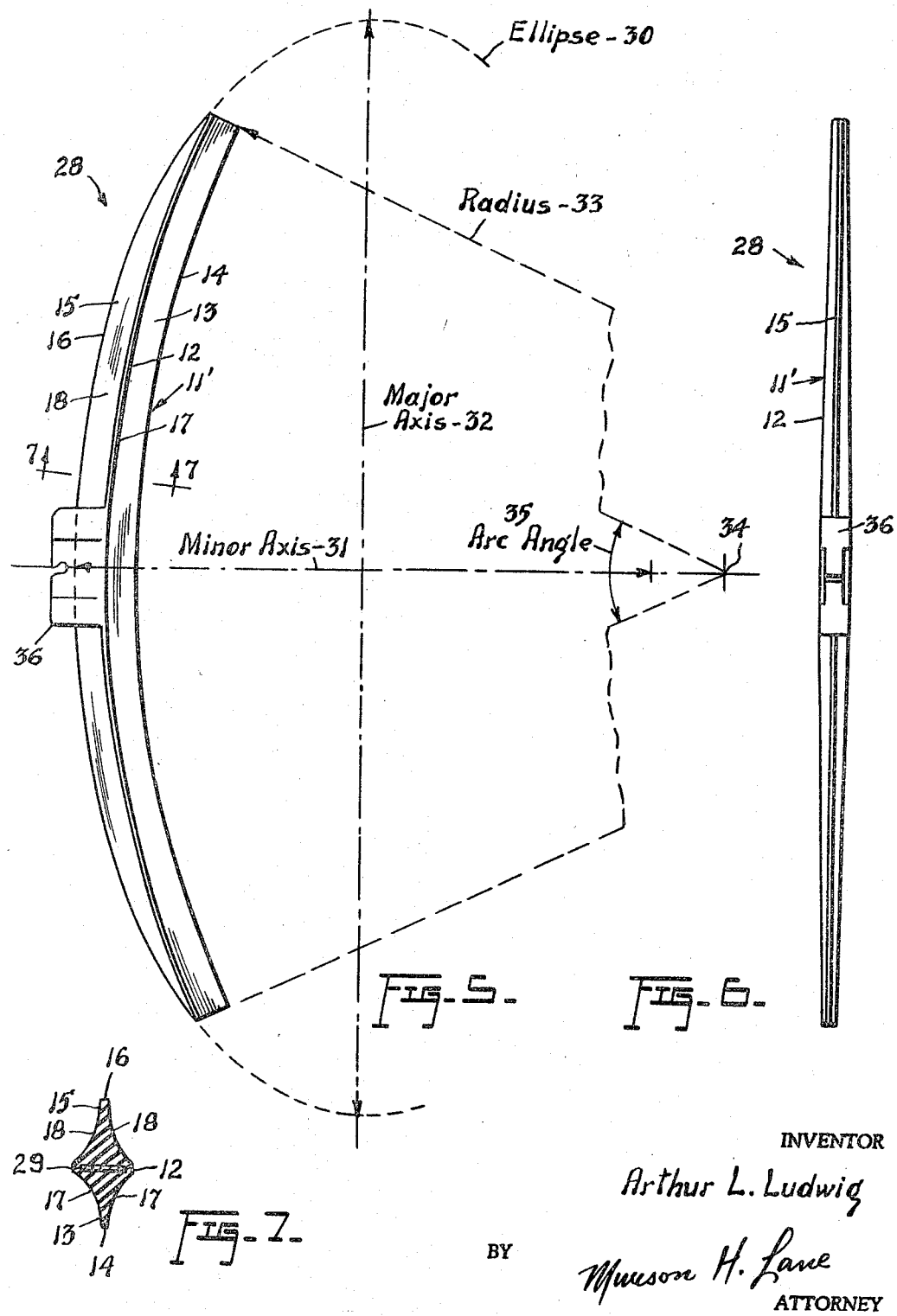

May 9, 1967 A. L. LUDWIG 3,317,945
MOLDED WINDSHIELD WIPER BLADE
Filed Sept. 17, 1965 3 Sheets-Sheet 3
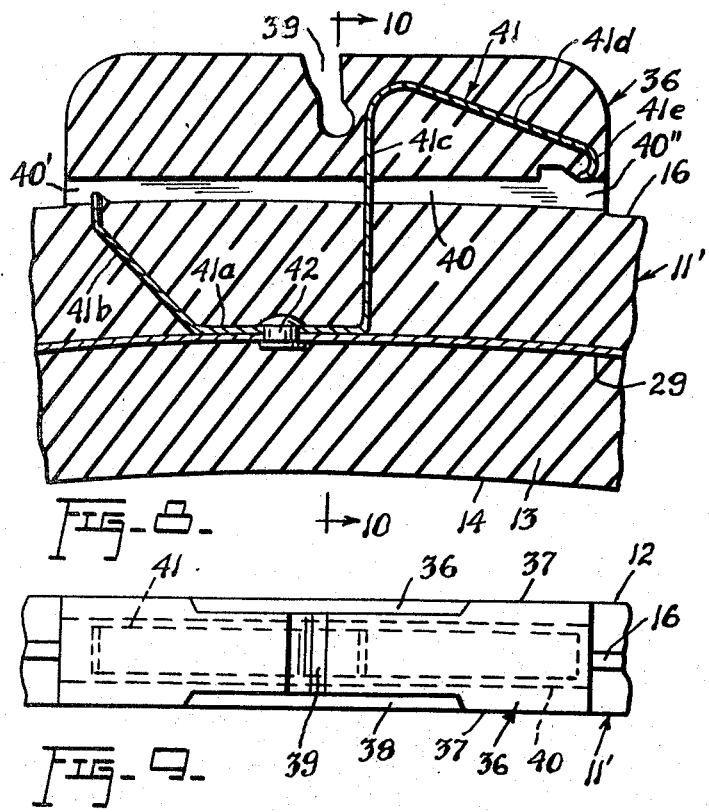
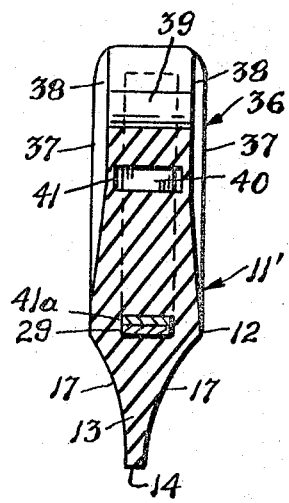
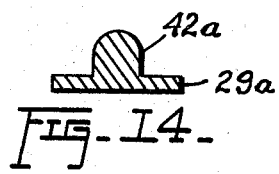
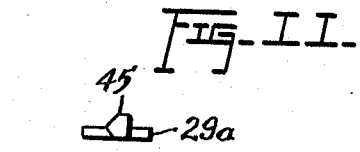
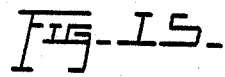
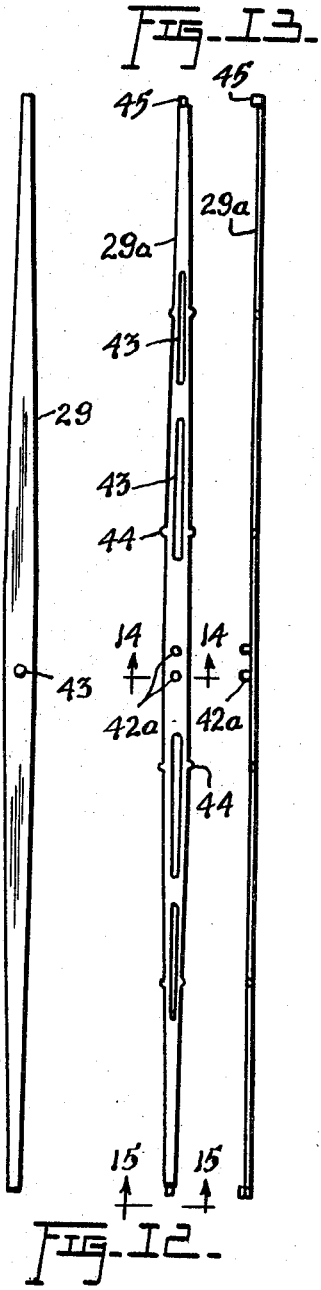
INVENTOR
Arthur L. Ludwig
BY Munson H. Lane
ATTORNEY

United States Patent Office 3,317,945
Patented May 9, 1967

3,317,945
MOLDED WINDSHIELD WIPER BLADE
Arthur L. Ludwig, Hastings, Mich., assignor to Hastings Manufacturing Company, Hastings, Mich., a corporation of Michigan
Filed Sept. 17, 1965, Ser. No. 488,224
26 Claims. (Cl. 15—250.36)

The present application is a continuation-in-part of my application Ser. No. 370,788, filed May 25, 1964, entitled, "Molded Windshield Wiper Blade" now abandoned.

The invention relates to new and useful improvements in windshield wiper blades and attaching mechanism therefor, and is primarily concerned with flexible blades used on curved windshields wherein the blade must conform to varying curvatures in a single stroke of its wiping movement.

An object of the invention is to provide an improved self-cleaning blade of this type which is especially suited for use under winter driving conditions when accumulation of ice, sleet or snow on blades of conventional types renders them virtually inflexible and, therefore, incapable of performing a satisfactory wiping operation.

As such, the improved blade of the invention is devoid of moving parts and requires no external backing member and consists of a resiliently flexible elastomeric body which flexes during its movement over a curved windshield and its flexing causes ice and snow films to crack and peel off the blade body without accumulating thereon and interfering with proper operation of the blade.

Another object of the invention is to provide suitable attaching means molded into or forming an integral part of the elastomeric body, whereby the blade may be secured to a suitable windshield wiper arm assembly.

Another feature of the invention resides in forming the blade body with a longitudinal curvature which exists when the blade is relaxed to assure a proper wiping contact with the windshield along the entire length of the blade when the latter is in its operating position.

Another feature resides in a tapered arrangement of the blade body, longitudinally from its center toward its ends, so that the end portions thereof have a controlled, greater flexibility and resiliency than its central portion, again for an effective wiping contact of the full length of the blade with the windshield.

Still another feature involves the provision of a stiffener which is embedded longitudinally in the blade body and which is preferably correspondingly tapered from its center toward its ends.

With the foregoing objects and features in view and such other objects and features as may become apparent as this specification proceeds, the invention will be understood from the following description taken in conjunction with the accompanying drawings, wherein like characters of reference are used to designate like parts, and wherein:

FIG. 1 is a side elevational view of one form of the improved wiper blade, shown partly in section;

FIG. 2 is an underside plan view thereof;

FIG. 3 is an enlarged cross-sectional view, taken substantially in the plane of the line 3-3 of FIG. 1;

FIG. 4 is an enlarged cross-sectional view, taken substantially in the plane of the line 4-4 of FIG. 1;

FIG. 5 is a side elevational view showing another embodiment of the improved wiper blade;

FIG. 6 is a top plan view thereof;

FIG. 7 is an enlarged cross-sectional detail, taken substantially in the plane of the line 7—7 of FIG. 5;

FIG. 8 is an enlarged, fragmentary longitudinal sectional view of the central portion of the blade of FIGS. 5 and 6;

FIG. 9 is a fragmentary top plan view of the subject shown in FIG. 8;

FIG. 10 is a cross-sectional view, taken substantially in the plane of the line 10—10 in FIG. 8;

FIG. 11 is a plan view of one form of stiffener such as may be used in the blade of FIGS. 5 and 6;

FIG. 12 is a plan view of another form of stiffener;

FIG. 13 is a side edge view of the stiffener of FIG. 12;

FIG. 14 is a cross-sectional view on an enlarged scale, taken substantially in the plane of the line 14—14 in FIG. 12; and FIG. 15 is an enlarged end view, taken in the plane of the line 15-15 in FIG. 12.

Referring now to the accompanying drawings in detail, the windshield wiper blade in accordance with the invention is designated generally by the reference numeral 10 and comprises an elongated, longitudinally curved unitary blade body 11 which is formed from suitable resiliently flexible elastomeric material, for example, natural rubber, one of the synthetic rubbers or urethane resin.

As shown, the blade body 11 has a substantially cruciform cross-section which includes a transverse intermediate body portion 12, normal to the plane of curvature of the body. A central, longitudinally extending rib 13 depends from one side, that is, the concave side of the intermediate body portion 12 and has a concave edge 14 which constitutes the wiping edge of the blade. Similarly, a central, longitudinally extending rib or spine 15 is provided on the other side, that is, the convex side of the intermediate body portion 12 and has a convex outer edge 16. As will be apparent from FIGS. 3 and 4, the rib 13 and the spine 15 are formed integrally with the body portion 12 and the cruciform cross-section of the body provides longitudinally extending, concave fillets 17 between the portion 12 and the rib 13, and similar fillets 18 between the portion 12 and the spine 15.

For purposes of controlled flexibility and resiliency the body portion 12 as well as the rib 13 and spine 15 are tapered longitudinally from the center of the blade toward its ends, so that the end portions of the blade are more flexible than the center portion thereof.

A strip-like stiffener 19 of flexible material, such as spring steel for example, is embedded longitudinally in the intermediate body portion 12, normal to the plane of curvature of the blade, the purpose of the stiffener being to provide lateral rigidity while permitting flexing of the blade in the plane of its curvature. Like the body portion 12, the stiffener strip 19 is tapered in width, longitudinally from the center of the blade toward the ends.

As will be apparent, the elastomeric blade body 11 including the transverse intermediate body portion 12 and the rib or spine portions 13 and 15 is of unitary construction and is so shaped as to equally distribute the load applied by the wiper arm (not shown) throughout the length of the wiper blade lip or fin 13 and hence requires no external backing means in the form of a leaf spring or the like as in prior art devices. This is made possible by the curvature 16 of the convex outer edge which is preferably greater than the curvature of the inner concave wiping edge 14.

The blade may be cast from suitable elastomeric material or may be injection molded from such material. The stiffener strip 19 may be made of metal or other suitable flexible material such as vinyl resin. It is not necessary that the stiffener be made of spring material though spring steel may be used as desired, the sole function of the strip 19 being to produce lateral rigidity rather than to serve as a pressure distribution member.

Where a synthetic resin stiffener strip is employed it will be understood that such strip will be preformed and embedded within the elastomeric unitary body portion 12 during the molding or casing operation. A vinyl resin strip may be suitably employed.

As shown in FIGS. 1 and 4, a mounting plate 20 is embedded in a mid-portion of the spine 15 and a suitable aperture 21 is formed in the plate and in the spine for attachment of the entire blade to any suitable coupling member (not shown) on the wiper arm. The plate 20 is preferably provided with additional apertures 22 into which the material of the spine 15 may flow during fabrication, whereby to assist in retaining the plate 20 embedded in the spine. If desired, the plate 20 may project outwardly from the spine for connection to the wiper arm coupling.

The mounting plate 20 may be of metal or other suitable material such as a preformed synthetic resin, for example, a vinyl resin such as vinyl chloride, and may be embedded within the elastomeric body 11 during the molding or casting operation as is the stiffening strip 19.

Reference is now drawn to the modified embodiment of the wiper blade shown in FIGS. 5–10 and designated generally by the numeral 28.

Like the blade 10, the blade 28 has an elongated, longitudinally curved unitary body 11' formed from suitable resiliently flexible elastomeric material, the blade body 11' also being substantially cruciform in cross-section and including the transverse intermediate body portion 12, the central longitudinal rib 13 with its wiping edge 14, and the central longitudinal spine 15 with its convex outer edge 16, as has been already described in connection with the blade 10. The blade body 11' is also longitudinally tapered from the center toward its ends, so that the end portions of the blade are more flexible than the center portion thereof for purposes of controlled flexibility and resiliency.

The outer convex edge 16 of the blade body preferably has the geometrical form of a segment of an ellipse indicated by the dotted lines 30, the major and minor axes of the ellipse being shown at 31, 32, respectively, with the minor axis 31 bisecting the length of the elliptical segment. In other words, the longitudinal center of the blade body lies on the minor axis of the ellipse, as shown.

The concave wiping edge 14 of the blade body preferably has the form of an arc of a circle having a radius 33 considerably larger, perhaps three or four times as large, as the minor axis 31 of the ellipse 30, so that the center 34 of the circle is disposed outside the ellipse, on the opposite side of the major axis 32 from the blade body. The circle center 34 lies on an extension of the minor axis 31 so that the arc angle 35 included between the ends of the blade body is bisected by the axis 31, as will be apparent from FIG. 5.

The intermediate portion 12 of the blade body concentrically parallels the arcuate form of the wiping edge 14, with the result that the spine 15 is longitudinally tapered from the center toward the ends of the blade body while the rib 13 is of uniform width throughout its length, this being brought about by the geometric relationship of the edges 14, 16 and of the portion 12, as already described. The aforementioned longitudinal tapering of the spine 15 in conjunction with the uniform width of the rib 13 facilitates balanced distribution of load applied by the wiper arm throughout the length of the wiping edge.

The body 11' of the blade 28 also has an elongated, strip-like reinforcing or stiffening member 29 embedded in the portion 12 thereof, corresponding to the aforementioned stiffener strip 19 in the blade 10. The strip 29 may be made of metal or other suitable material such as vinyl resin, and the sole function thereof is to render the blade body 11' laterally rigid, that is, to resist any forces such as may tend to flex the blade in a lateral direction. The stiffener strip 29 is not at all relied upon to maintain the blade body in its longitudinally curved form, nor is it expected to serve in the distribution of pressure along the length of the wiping edge, it being understood that the blade body inherently retains its longitudinally curved form as a result of being cast or molded in such a form, and that a properly balanced distribution of load along the wiping edge inherently arises from the longitudinally taper of the blade body, as already described.

As such, the stiffener strip 29 need not be resilient, although it should be flexible so that it may be curved to an appropriate form during its placement in the mold, after which the material of the blade body is poured into the mold around the strip and the strip thus becomes embedded in the blade body.

The body 11' of the blade 28 is provided on the midportion thereof with an integral mounting block 36 for attachment of the blade to a wiper arm (not shown). The block 36 is cast or molded integrally with the blade body and extends outwardly from the body portion 12 beyond the outer edge 16 of the spine 15. The block 36 is of the same thickness as the blade portion 12, so that the sides 37 of the block are parallel as shown in FIG. 10. However, the block sides 37 are formed with recesses or indentations 38 and the portion of the block beyond the spine edge 16 is provided with an open slot 39, whereby one particular type of a wiper arm may be attached to the blade.

In addition, the block 36 is provided with an open-ended, longitudinally extending passage 40, one end portion 40' of which is adapted to receive another particular type of a wiper arm, while the opposite end portion 40'' of the passage is adapted to receive still another type of a wiper arm, thus permitting the same blade to be used selectively with wiper arms of three different types.

Means are provided for reinforcing the mounting block 36 with respect to the blade body 11', particularly to prevent the block from flexing in a lateral direction as movement of the wiper arm is applied thereto. Such means comprise a strip 41 of metal, plastic, or the like, which may or may not be resilient. The reinforcing strip 41 is angulated and curved substantially as shown in FIG. 8 and has an intermediate portion 41a which overlies and contacts the aforementioned reinforcing strip 29, being rigidly secured thereto as by a rivet 42 positioned in an aperture 43 (see FIG. 11) formed in the strip 29.

At one side of the intermediate portion 41a, the strip 41 has an end portion 41b which reinforces the end portion 40' of the passage 40, while on the other side of the portion 41a the strip continues substantially perpendicularly as at 41c, traversing the passage 40 on its way into the outer portion of the block 36, where the other end portion 41d of the strip terminates in a curved extremity 41e at the end portion 40'' of the passage.

It will be observed that the strip 41, apart from serving its primary purpose of reinforcing the block 36 against lateral deflection, has its portions 41b, 41c and 41e disposed adjacent the sockets 20', 39 and 40'', respectively, in which wiper arms may be selectively positioned. Thus, the strip also serves to reinforce the block 36 so as to assist in retaining the wiper arms in their respective sockets.

FIGS. 12–15 illustrate a modified embodiment of the reinforcing strip 29a which may be used in substitution for the aforementioned strip 29. Like the strip 29, the strip 29a is longitudinally tapered from the center toward its ends. In addition, the strip 29a is provided with a plurality of longitudinal slots 43, into which material of the blade body may flow during fabrication so as to hold the strip securely embedded in place. For the same purpose, a plurality of projecting detents 44 may be provided on the longitudinal side edges of the strip, as well as suitable enlargements 45 at the ends thereof.

Separate rivets may be used (such as the aforementioned rivet 42) to secure the strips 29a and 41 together, but alternatively, the strip 29a may be formed integrally with one or more studs 42a to function as rivets in securing the strip 41 to the strip 29a. While FIG. 8 shows only one rivet 42, two or more of the rivet-like elements may be provided, as at 42a in FIGS. 12 and 13, so as to prevent any possibility of the strip 41 twisting or turning about a single rivet on the strip 29.

While in the foregoing there has been described and shown the preferred embodiment of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed is:

1. A molded self-cleaning windshield wiper blade adapted for use under winter driving conditions comprising a unitary elongated and longitudinally curved body formed from elastomeric material, said body being tapered longitudinally in its plane of curvature from its center toward its ends and having a smoothly curved concave edge constituting a wiping edge and a thin longitudinally curved convex edge opposite said concave wiping edge having a curvature greater than that of the wiping edge.

2. A molded self-cleaning windshield wiper blade adapted for use under winter driving conditions comprising a unitary elongated and longitudinally curved body formed from elastomeric material, said body being tapered longitudinally in its plane of curvature from its center toward its ends and having a smoothly curved concave edge constituting a wiping edge and a thin longitudinally curved convex edge opposite said concave wiping edge having a curvature greater than that of the wiping edge, a strip-like stiffener of resiliently flexible material embedded longitudinally in said body with its flat sides normal to the plane of curvature of the body, said stiffener serving to provide lateral rigidity while permitting flexing of the blade in the plane of its curvature.

3. A blade as defined in claim 2 wherein the stiffener comprises a metal strip.

4. A blade as defined in claim 2 wherein the stiffener comprises a preformed vinyl resin strip.

5. A molded self-cleaning windshield wiper blade adapted for use under winter driving conditions comprising a unitary elongated and longitudinally curved body formed from elastomeric material, said body being tapered longitudinally in its plane of curvature from its center toward its ends and having a smoothly curved concave edge constituting a wiping edge and a thin longitudinally curved convex edge opposite said concave wiping edge having a curvature greater than that of the wiping edge, a separate strip-like stiffener of resiliently flexible material embedded longitudinally in said body with its flat sides normal to the plane of curvature of the body, said stiffener also being tapered longitudinally from its center toward its ends, and serving to provide rigidity while permitting flexing of the blade in the plane of its curvature.

6. A molded windshield wiper blade comprising a unitary elongated and longitudinally curved body formed from elastomeric material, said body being tapered longitudinally in its plane of curvature from its center toward its ends and having a curved inner concave edge constituting a wiping edge and a thin longitudinally curved outer convex edge opposite said concave wiping edge having a curvature greater than that of the wiping edge, said blade body having a thickened transverse intermediate portion normal to the plane of curvature of said body, and tapering toward the convex and concave edges.

7. A molded windshield wiper blade comprising a unitary elongated and longitudinally curved body formed from elastomeric material, said body being tapered longitudinally in its plane of curvature from its center toward its ends and having a smoothly curved inner concave edge constituting a wiping edge and a smoothly curved outer convex edge opposite said concave wiping edge having a curvature greater than that of the wiping edge, a thin longitudinally curved convex edge portion opposite said wiping edge having a curvature greater than that of the wiping edge, said blade body having a thickened transverse longitudinally extending intermediate portion normal to the plane of curvature of said body and tapering from its center toward its ends.

8. A molded wiper blade comprising a unitary elongated and longitudinally curved body formed from elastomeric material, said body being tapered longitudinally in its plane of curvature from its center toward its ends and having a smoothly curved concave edge constituting a wiping edge and a thin longitudinally curved elliptical convex edge opposite said concave wiping edge having a curvature greater than that of the wiping edge.

9. A molded windshield wiper blade comprising a unitary elongated and longitudinally curved body formed from elastomeric material, said body being tapered longitudinally in its plane of curvature from its center toward its ends and having a thin longitudinally curved concave edge portion constituting a wiping edge, a thin longitudinally curved convex edge portion opposite said concave wiping edge portion having a curvature greater than that of the wiping edge, and a blade mounting plate embedded within the center portion of said thin convex edge portion.

10. A molded windshield wiper blade comprising a unitary elongated and longitudinally curved body formed from elastomeric material, said body being tapered longitudinally in its plane of curvature from its center toward its ends and having a thin longitudinally curved convex outer edge defining a segment of an ellipse and a concave inner edge defining an arc of a circle, said arcuate inner edge constituting the wiping edge of the blade.

11. The blade as defined in claim 10 wherein the elliptical segment defined by said outer edge has a major axis and also a minor axis bisecting the length of said segment, the arc of the circle defined by said inner edge having a radius substantially greater than the minor axis of said ellipse.

12. The blade as defined in claim 10 wherein the elliptical segment defined by said outer edge has a major axis and also a minor axis bisecting the length of said segment, the arc of the circle defined by said inner edge having a radius substantially greater than the minor axis of the ellipse with the center of the circle lying on said minor axis projected outside the ellipse to the opposite side of the major axis with respect to said blade.

13. A windshield wiper blade comprising a unitary elongated and longitudinally curved body formed from elastomeric material, said body being tapered longitudinally in its plane of curvature from its center toward its ends and having a convex outer edge defining a segment of an ellipse, a concave inner edge constituting the wiping edge and defining an arc of a circle, and a transversely thickened intermediate portion normal to the plane of curvature of said body, said intermediate portion being arcuate and concentrically parallel to the arc of said inner wiping edge.

14. The blade as defined in claim 13 wherein the elliptical segment defined by said outer edge has a major axis and also a minor axis bisecting the length of said segment, the arc of the circle defined by said inner wiping edge having a radius substantially greater than the minor axis of said ellipse.

15. The blade as defined in claim 14 wherein the center of the concentric arcs defined by said inner wiping edge and by said intermediate blade portion lie on said minor axis projected outside the ellipse to the opposite side of the major axis with respect to said blade.

16. A molded windshield wiper blade comprising a unitary elongated and longitudinally curved body formed from elastomeric material, an elongated and longitudinally curved stiffener strip embedded in said body to reinforce the same against lateral deflection, a wiper arm mounting block formed integrally with the mid-portion of said body and projecting outwardly therefrom, and a strip-like stiffening member embedded in said block and rigidly secured to said stiffening strip in said body to prevent lateral deflection of said block.

17. A molded windshield wiper blade comprising a unitary elongated and longitudinally curved body formed from elastomeric material, said body having a convex outer edge, a concave inner edge constituting the wiping edge, and a transversely thickened intermediate portion normal to the plane of curvature of said body, a wiper arm mounting block formed integrally with said body intermediate of its ends and projecting from said thickened intermediate portion outwardly beyond said convex outer edge, an elongated and longitudinally curved stiffener strip embedded in said thickened intermediate portion of said body to reinforce the same against lateral deflection, a strip-like stiffening member embedded in said block, said stiffening member having an intermediate portion superposed on said stiffener strip, and means rigidly securing the intermediate portion of said stiffening member to said stiffener strip whereby to prevent lateral deflection of said block relative to said body.

18. A windshield wiper blade comprising an elongated and longitudinally curved body formed from resiliently flexible material, said body having a substantially cruciform cross-section and including a transverse intermediate portion normal to the plane of curvature of the body, a central rib depending from said intermediate portion and having a concave edge constituting a wiping edge, and a central spine on said intermediate portion coplanar with said rib in said plane of curvature, said intermediate portion and said rib and said spine being tapered longitudinally from the center of said body toward its ends.

19. The blade as defined in claim 18, together with a strip-like stiffener embedded in said intermediate portion of said body with its flat sides normal to said plane of curvature, said stiffener also being tapered from its center toward its ends.

20. The blade as defined in claim 18 together with a blade mounting plate embedded in the center portion of said spine.

21. The blade as defined in claim 18 wherein the cruciform cross-section of said body has concave fillets joining said rib and said spine to said intermediate portion of the body.

22. A windshield wiper blade comprising an elongated and longitudinally curved body formed from resiliently flexible material, said body having a substantially cruciform cross-section and including a transverse intermediate portion normal to the plane of curvature of the body, a central rib depending from one side of said intermediate portion and having a concave edge constituting a wiping edge, a central spine provided on the other side of the intermediate portion coplanar with said rib in said plane of curvature and having a convex outer edge, and a strip-like resiliently flexible stiffener embedded longitudinally in said intermediate body portion with its flat sides normal to the plane of curvature, said intermediate portion and said rib and said spine and said stiffener being tapered longitudinally from the center of the body toward its ends.

23. The blade as defined in claim 22 together with a blade mounting plate embedded in the center portion of said spine.

24. The blade as defined in claim 22 wherein said body is formed from urethane resin.

25. A windshield wiper blade comprising an elongated and longitudinally curved body formed from resiliently flexible material, said body including a transverse intermediate portion normal to the plane of curvature of the body, a central rib depending from said intermediate portion and having a concave edge constituting a wiping edge, and a central spine on said intermediate portion coplanar with said rib in said plane of curvature, said intermediate portion and said rib and said spine being tapered longitudinally from the center of said body toward its ends, said central spine having a convex edge of greater curvature than that of the wiping edge.

26. A molded windshield wiper blade as defined in claim 16 wherein the wiper arm mounting block is provided with a plurality of attaching means for wiper arms of different types.

References Cited by the Examiner
UNITED STATES PATENTS

| | | | |
|---|---|---|---|
| 2,543,383 | 2/1951 | Scinta et al. | 15—250.40 |
| 2,901,761 | 9/1959 | Wallis | 15—250.42 |
| 3,107,384 | 10/1963 | Wise | 15—250.42 |

CHARLES A. WILLMUTH, *Primary Examiner.*